United States Patent [19]
Hishikawa

[11] Patent Number: 5,805,368
[45] Date of Patent: Sep. 8, 1998

[54] METHOD AND APPARATUS ADOPTING A DATA SURFACE SERVO METHOD IN WHICH THE SERVO INFORMATION IS IN THE FORM OF A GRAY CODE AND SERVO ZONE SECTOR NUMBERS

[75] Inventor: Tetsuyuki Hishikawa, Tokyo, Japan

[73] Assignee: NEC Corporation, Japan

[21] Appl. No.: 782,317

[22] Filed: Jan. 15, 1997

[30] Foreign Application Priority Data

Jan. 17, 1996 [JP] Japan .................................. 8-005697

[51] Int. Cl.$^6$ ....................................................... G11B 5/09
[52] U.S. Cl. .............................................. 360/51; 360/48
[58] Field of Search ........................... 360/51, 60, 78.14, 360/77.08, 69, 25, 48; 369/54

[56] References Cited

U.S. PATENT DOCUMENTS

| | | | |
|---|---|---|---|
| 5,438,559 | 8/1995 | Best et al. .................................. | 369/54 |
| 5,627,695 | 5/1997 | Prins et al. ......................... | 360/77.08 X |
| 5,666,238 | 9/1997 | Igari et al. ......................... | 360/78.14 X |

Primary Examiner—Aristotelis M. Psitos
Assistant Examiner—Patrick Wamsley
Attorney, Agent, or Firm—Hayes, Soloway, Hennessey, Grossman Hage, P.C.

[57] ABSTRACT

In a magnetic disk apparatus adopting a data surface servo method, and an improved data surface servo method for the magnetic disk apparatus, a Gray code sector number is included in a Gray code region, and a servo zone counter is controlled to start its counting operation after the unquestionableness and the continuity of the Gray code sector number are confirmed. Therefore, it becomes possible to detect a rotational position of the disk in real time, and also possible to discriminate which of the fault of the servo zone counter and a misreading of the Gray code sector number is a trouble. Thus, reliability in detection of a rotational position of a magnetic disk is improved. By comparing the Gray code sector number with the servo zone number signal outputted from the servo zone counter, it is possible to detect the fault of the servo zone counter, and therefore, it is possible to prevent the writing operation based on an erroneous detection of the rotational position, thereby to avoid a data destroy.

2 Claims, 3 Drawing Sheets

METHOD AND APPARATUS ADOPTING A DATA SURFACE SERVO METHOD IN WHICH THE SERVO INFORMATION IS IN THE FORM OF A GRAY CODE AND SERVO ZONE SECTOR NUMBERS

BACKGROUND OF THE INVENTION

1. Field of the Invention

The present invention relates to a magnetic disk apparatus adopting a data surface servo method, and more specifically, to a magnetic disk apparatus adopting a data surface servo method, which has an improved reliability in detection of a rotational position of a magnetic disk, and an improved data surface servo method for the magnetic disk apparatus.

2. Description of Related Art

In a prior art magnetic disk apparatus adopting the data surface servo method, only a cylinder address is recorded in a Gray code region. In addition, a rotational position is detected by using a servo zone counter which is re-loaded by detecting an index part appearing one for each one revolution. This prior art magnetic disk apparatus has encountered the following problems.

A first problem is that: Since only the cylinder address was recorded in the Gray code region, the rotational position was detected by using the servo zone counter. On the other hand, the servo zone counter is initialized by detecting the index part appearing one for each one revolution. Therefore, it is not possible to discriminate whether or not the serve zone counter is faulty. Here, the reason for this circumstance that only the cylinder address was recorded in the Gray code region, is that a data region is ensured by simplifying the Gray code.

A second problem is that: Since the rotational position was detected by using the servo zone counter, even if the servo zone counter is faulty for any cause, there is no means for knowing that the servo zone counter is faulty, and therefore, a data transfer is executed between the magnetic disk apparatus and a high level equipment, reposing confidence in an output of the servo zone counter. Therefore, possibility of writing data to an incorrect location is inevitable.

The background of the above mentioned problems is that, in the prior art, since reliability of data was not required so far, if fault occurs, it is sufficient if the device is replaced with another.

SUMMARY OF THE INVENTION

Accordingly, it is an object of the present invention to provide a magnetic disk apparatus adopting a data surface servo method, and a data surface servo method for the magnetic disk apparatus, which have overcome the above mentioned problems of the conventional one.

Another object of the present invention is to provide a magnetic disk apparatus which adopts a data surface servo method improving the reliability in detection of a rotational position of a magnetic disk, and an improved data surface servo method for the magnetic disk apparatus.

The above and other objects of the present invention are achieved in accordance with the present invention by a magnetic disk apparatus adopting a data surface servo method, wherein a magnetic disk includes a plurality of tracks formed thereon, and in each of the tracks, servo information used for positioning a head in the track, is written with equal intervals, characterized in that each of the servo information contains, in the form of a Gray code, a cylinder number indicative of an address of the track, and a sector number indicative of the order of the servo information in the track.

More specifically, the magnetic disk apparatus in accordance with the present invention, comprises:

a shift register receiving, in response to a system clock, a digital read-out signal which is generated in the form of a pulse from an analog signal including servo information, the shift register outputting a shift register output signal in the form of parallel data, including a Gray code;

a timing generator enabled in response to a motor speed good signal which is activated when the revolution speed of the magnetic disk apparatus is a revolution number of a steady-state revolution, for generating a Gray code search signal, the timing generator receiving the system clock, for generating a servo zone signal used for detecting a servo zone, at a predetermined interval after an index signal is received;

a Gray code detecting circuit receiving the shift register output signal, and enabled in response to the Gray code search signal, to decode the Gray code included in the shifter register output signal and including a Gray code cylinder number and a Gray code sector number, the Gray code detecting circuit outputting the Gray code sector number, the Gray code detecting circuit also detecting an index pattern which is included in the shift register output signal and which appears one for each one track, the Gray code detecting circuit outputting the index signal at each time the index pattern is detected;

a servo zone counter loaded with a sector number indicated by a sector number notify signal, and enabled, in response to a servo count start signal, to start to count up its count value which starts from the loaded sector number and is incremented in response to each servo zone signal, the count value of the servo zone counter being outputted as a servo zone number signal;

a servo control microprocessing unit receiving the Gray code sector number, the index signal and the servo zone signal, for checking unquestionableness and continuity of the Gray code sector number and for outputting to the servo zone counter the sector number notify signal indicative of the sector number to be received next, after the unquestionableness and the continuity of the Gray code sector number are confirmed, the servo control microprocessing unit outputting the servo count start signal to the servo zone counter after the sector number indicated by the sector number notify signal is loaded into the servo zone counter, the servo control microprocessing unit monitoring the servo number signal at each time receiving the servo zone signal, for checking a continuous counting-up of the servo number signal, to return the operation of outputting the sector number notify signal if the servo number signal is not counted up continuously; and a comparator comparing the Gray code sector number and the servo zone number signal at each time the servo zone signal is generated, for outputting a coincidence signal when the Gray code sector number and the servo zone number signal becomes coincident with each other.

According to the present invention, there is provided a data surface servo method for a magnetic disk apparatus wherein a magnetic disk includes a plurality of tracks formed thereon, and in each of the tracks, servo information used for positioning a head in the track, is written with equal intervals, characterized in that each of the servo information contains, in the form of a Gray code, a cylinder number indicative of an address of the track, and a sector number indicative of the order of the servo information in the track, and characterized in that the method comprises the steps:

fetching into a shift register, in response to a system clock, a digital read-out signal which is generated in the form of a pulse from an analog signal including servo information, and outputting a parallel output of the shift register as a shift register output signal including a Gray code;

generating a Gray code search signal in response to a motor speed good signal which is activated when the revolution speed of the magnetic disk apparatus is a revolution number of a steady-state revolution, and receiving the system clock, for generating a servo zone signal used for detecting a servo zone, at a predetermined interval after an index signal is received;

receiving the shift register output signal in response to the Gray code search signal, to decode the Gray code included in the shift register output signal and including a Gray code cylinder number and a Gray code sector number, for outputting the Gray code sector number, and also detecting an index pattern which is included in the shift register output signal and which appears one for each one track, for outputting the index signal at each time the index pattern is detected;

loading a servo zone counter with a sector number indicated by a sector number notify signal, and enabling the servo zone counter in response to a servo count start signal, to cause it to start to count up its count value which starts from the loaded sector number and is incremented in response to each servo zone signal, and outputting the count value of the servo zone counter as a servo zone number signal;

receiving the Gray code sector number, the index signal and the servo zone signal, for checking unquestionableness and continuity of the Gray code sector number and outputting to the servo zone counter the sector number notify signal indicative of the sector number to be received next, after the unquestionableness and the continuity of the Gray code sector number are confirmed, and further outputting the servo count start signal to the servo zone counter after the sector number indicated by the sector number notify signal is loaded into the servo zone counter;

monitoring the servo number signal at each time receiving the servo zone signal, for checking a continuous counting-up of the servo number signal, to return the operation of outputting the sector number notify signal if the servo number signal is not counted up continuously; and comparing the Gray code sector number and the servo zone number signal at each time the servo zone signal is generated, for outputting a coincidence signal when the Gray code sector number and the servo zone number signal becomes coincident with each other.

With this arrangement, since the Gray code sector number is included in the Gray code region, and since the servo zone counter is controlled to start the counting operation after the unquestionableness and the continuity of the Gray code sector number are confirmed, it is possible to detect the rotational position of the disk in real time, and it also possible to discriminate which of the fault of the servo zone counter and a misreading of the Gray code sector number is a trouble.

In addition, by comparing the Gray code sector number with the servo zone number signal which is the output of the servo zone counter, it is possible to detect the fault of the servo zone counter. Therefore, it is possible to prevent the writing operation based on an erroneous detection of the rotational position, thereby to avoid a data destroy.

The above and other objects, features and advantages of the present invention will be apparent from the following description of a preferred embodiment of the invention with reference to the accompanying drawings.

DESCRIPTION OF THE PREFERRED EMBODIMENT

Figure 1:
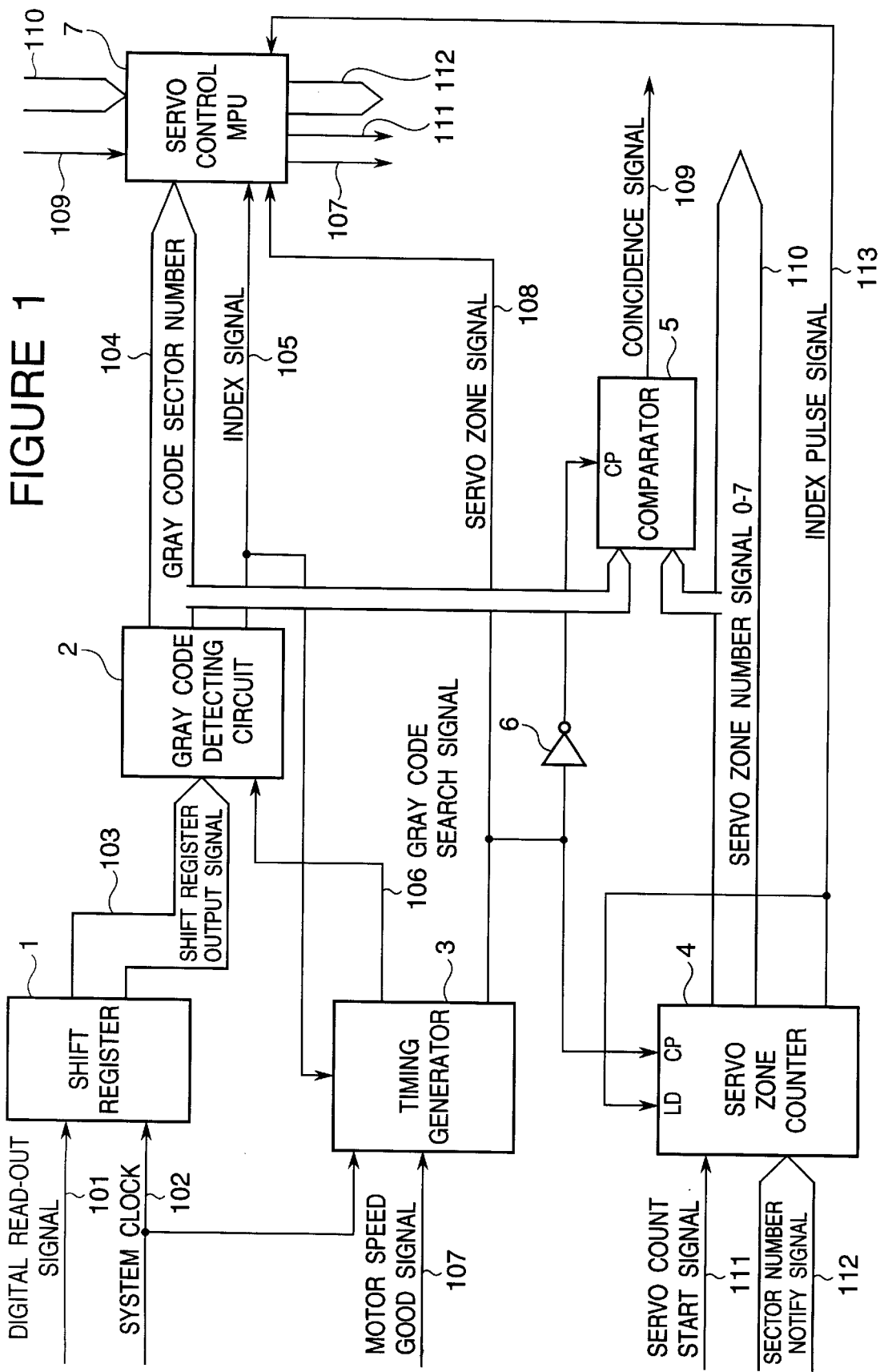
FIG. 1 is a block diagram of an essential part of an embodiment of the magnetic disk apparatus adopting the data surface servo method in accordance with the present invention.

Referring to FIG. 1, there is shown a block diagram of an essential part of an embodiment of the magnetic disk apparatus adopting the data surface servo method in accordance with the present invention.

The shown embodiment includes a shift register 1 receiving a digital read-out signal 101 and a system clock 102, and generating a shifter register output signal 103, and a Gray code detecting circuit 2 receiving the shifter register output signal 103 and a Gray code search signal 106 outputted from a timing generator 3, and generating a Gray code sector number 104 and an index signal 105 to a servo control MPU (microprocessing unit) 7. The timing generator 3 receives the system clock 103 and a motor speed good signal 107, and generates the Gray code search signal 106 and a servo zone signal 108. This servo zone signal 108 is supplied to the servo control MPU 7, and on the other hand, the motor speed good signal 107 is generated by the servo control MPU 7. This motor speed good signal 107 becomes "true", namely, is activated, when a spindle motor (not shown) of the magnetic disk apparatus becomes a steady-state revolution, and is maintained in the "true condition", namely, in an active condition when the spindle motor of the magnetic disk apparatus is in the steady-state revolution.

The shown embodiment also includes a servo zone counter 4 receiving a servo count start signal 111 and a sector number notify signal 112 and controlled to count the servo zone signal 108, for generating a servo zone number signal 110 and an index pulse signal 113. The Gray code sector number 104 and the servo zone number signal 110 are compared by a comparator 5, which is controlled by an inverted signal of the servo zone signal 108, outputted from an inverter 6 receiving the servo zone signal 108, and outputs an active coincidence signal 109 when the Gray code sector number 104 and the servo zone number signal 110 are coincident with each other. Furthermore, the servo zone number signal 110 and the index pulse signal 113 are supplied to the servo control MPU 7. Here, it is to be noted that various signals are supplied to and outputted from the servo control MPU 7, but only signals relating to the present invention are shown in FIG. 1 and described above for simplification of drawing and description.

Figure 2:
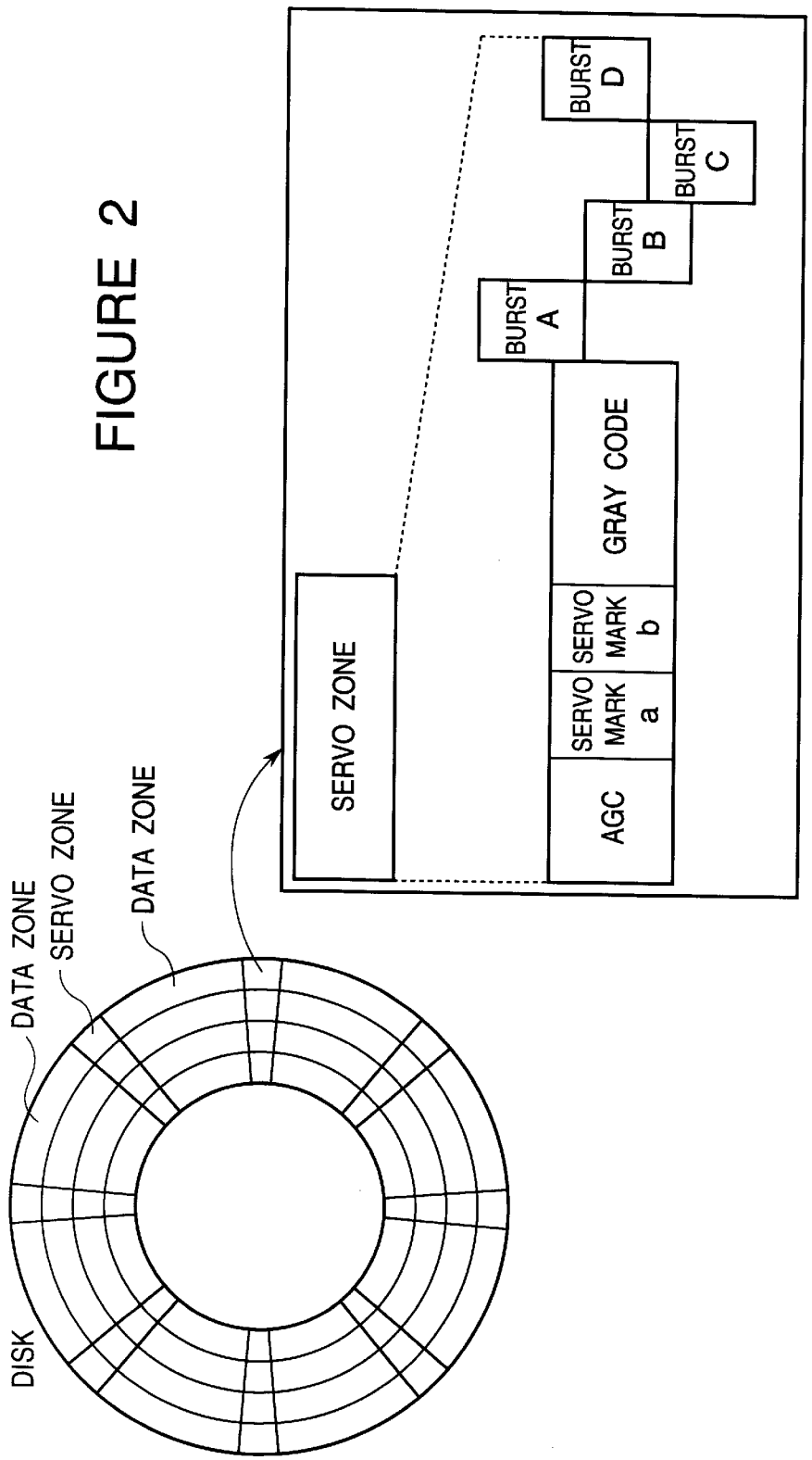
FIG. 2 illustrates the details of information recorded in a servo zone on a disk recording medium in the data surface servo method in accordance with the present invention.

Here, referring to FIG. 2, the details of information recorded in a servo zone on a disk recording medium in the data surface servo method in accordance with the present invention is illustrated. On a disk recording medium, a number of concentric tracks are formed, and each of the tracks includes one index, a plurality of data zones located with equal angular intervals, and the same number of servo (information) zones used for positioning a magnetic head to a track to be traced. The data zones and the servo zones are alternately located. Therefore, the servo zones are located with equal angular intervals, similarly to the data zones. Each of the servo zones is mainly constituted of two portions, one of which is a Gray code region, and the other of which is a burst information used for positioning. In accordance with the present invention, the Gray code region includes a cylinder number indicative of an address of the track being traced, and a sector number indicative of the order or rank of the servo information in the track being traced.

Now, operation of the circuit shown in FIG. 1 will be described.

Servo information written in a magnetic disk recording medium is read out by a magnetic head (not shown) in the form of an analog signal, which is, in turn, analog-to-digital converted into the digital read-out signal 101. This digital read-out signal 101 is supplied to the shift register 101, and fetched and shifted in the shift register 101 in synchronism with the system clock 102. The shift register output signal 103 outputted in parallel from the shift register 1, includes a Gray code, and is supplied to the Gray code detecting circuit 2, which has a function of a Gray code decoder.

As mentioned above, on the other hand, the motor speed good signal 107 is active when the revolution speed of the magnetic disk apparatus is a revolution speed of the steady-state revolution. If the motor speed good signal 107 becomes "true", namely is activated, it at a first place becomes possible to detect the Gray code and others. The moment the motor speed good signal 107 becomes "true", namely is activated, becomes a starting point of a data writing/reading operation. When the motor speed good signal 107 is activated by the servo control MPU 7, the timing generator 3 starts its operation and activates the Gray code search signal 106. Furthermore, after the timing generator 3 receives the index signal 105, the timing generator 3 generates, at a predetermined period, the servo zone signal 108 for detecting a servo zone.

Incidentally, after the servo control MPU 7 detects the steady-state revolution of the spindle motor of the magnetic disk apparatus and then activates the motor speed good signal 107, the servo control MPU 7 detects the index signal 105 and then executes a more precise revolution control of the spindle motor of the magnetic disk apparatus (phase control) while monitoring the status of the spindle of the magnetic disk apparatus. The index signal 105 can be detected in all or most of tracks of a magnetic disk, however, the index signal 105 cannot be rarely detected when a medium defect exists in an index zone. When the index signal 105 is not detected, the servo control MPU 7 executes the more precise revolution control of the spindle motor, by using the index pulse signal 113 in place of the index signal 105. Because, unless the servo zone counter is faulty, the index pulse signal 113 is generated at substantially the same timing as that of generation of the index signal 105.

When the Gray code detecting circuit 2 receives an active Gray code search signal 106, the Gray code is detected in the Gray code detecting circuit 2, and the detected Gray code is divided into a cylinder address and a Gray code sector number 104. The Gray code sector number 104 is outputted from the Gray code detecting circuit 2. Furthermore, an index pattern written one for each one track (namely, each one revolution) is detected in the Gray code detecting circuit 2, and the index signal 105 is outputted from the Gray code detecting circuit 2. As mentioned above, the Gray code sector number 104 and the index signal 105 are supplied to the servo control MPU 7, and the Gray code sector number 104 is also supplied to the comparator 5.

The servo control MPU 7 examines the Gray code sector number 104 at each time it receives the servo zone signal 108, and confirms unquestionableness and continuity of the Gray code sector number. After the unquestionableness and the continuity are confirmed, the servo control MPU 7 loads to the servo zone counter 4 the sector number notify signal 112 which is indicative of the Gray code sector number 104 to be received next. After completion of this loading, the servo control MPU 7 delivers the servo count start signal 111 to the servo zone counter 4, to cause the servo zone counter 4 to start its counting operation.

At each time the servo zone counter 4 receives the servo zone signal 108, the servo zone counter 4 counts up its count value by "1" (namely, "1" is added to the value indicated by the loaded sector number notify signal 112), and outputs the "1"-added value as the servo zone number signal 110 to the comparator 5 and the servo control MPU 7. The servo control MPU 7 monitors the servo number signal 110 at each time receiving the servo zone signal 108, for checking whether or not the servo number signal 110 is continuously counted up at each time that the servo zone signal 108 is generated. If the servo number signal 10 is not counted up continuously, the servo control MPU 7 concludes that the servo zone counter 4 is faulty, and to re-tries the checking operation.

The servo zone counter 4 is prefetched with the count value at which the servo zone counter 4 causes an overflow. This count value corresponds to the number of servo zones in each one track. If the servo zone counter 4 overflows, the servo zone counter 4 outputs the index pulse signal 113, which is fed back to a load input LD of the servo zone counter 4, so that the count value of the servo zone counter 4 is returned to "0" and the servo zone counter 4 re-starts the counting operation from "0". Namely, when the servo zone counter 4 overflows, the count value of the servo zone counter 4 is initialized to "0".

At each time the comparator 5 receives the servo zone signal 108, the comparator 5 compares the Gray code sector number 104 and the servo zone number signal 110, and activates the coincidence signal 109 when coincidence is obtained. Namely, this coincidence signal 109 is activated only when the servo zone counter 4 operates normally and when the Gray code sector number 104 is correct. The coincidence signal 109 is supplied to the servo control MPU 7. If the servo control MPU 7 receives the active coincidence signal 109, the servo control MPU 7 concludes that the servo zone counter 4 operates normally and the Gray code sector number 104 is correct, and can go to a next operation (not shown).

Figure 3:
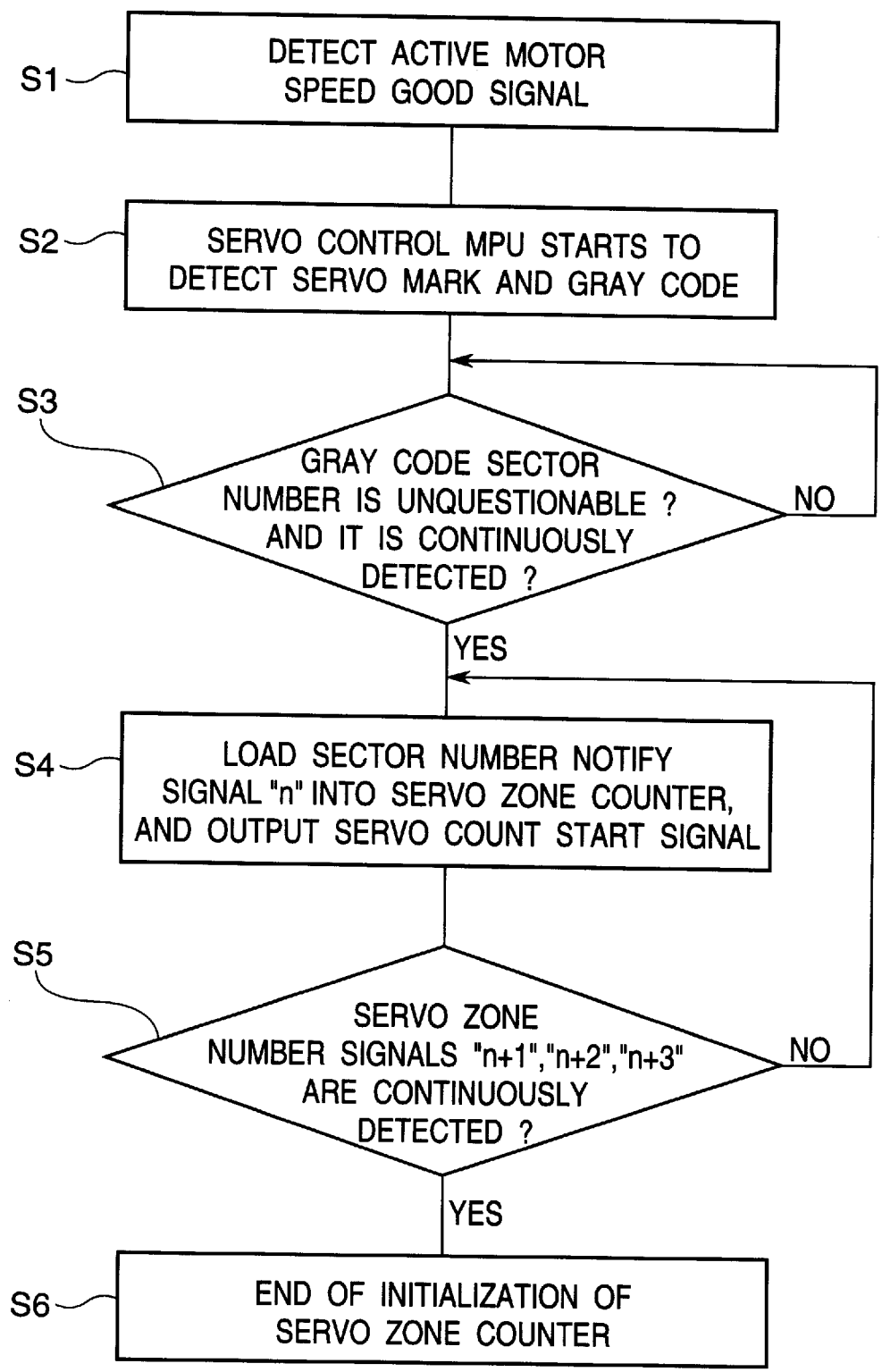
FIG. 3 is a flow chart illustrating an operation of the data surface servo method in accordance with the present invention for the magnetic disk apparatus in accordance with the present invention.

Next, a detailed operation will be described with FIG. 3, which is a flow chart illustrating an operation of the data surface servo method in accordance with the present invention for the magnetic disk apparatus.

When the motor speed good signal 107 is activated (Step S1), it starts to detect the servo mark and the Gray code (Step S2). If the servo mark and the Gray code are detected, and also if the detected Gray code sector number 104 becomes unquestionable, the servo control MPU 7 checks whether or not the Gray code sector number 104 increases continuously two times in a period in which the servo zone signal 106 is received two times (Step S3). The reason for this is that: Since there is a case that a medium defect is at a location of the Gray code sector number and therefore the Gray code sector number cannot be properly decoded, it does not start to cause the servo zone counter 4 to operation unless the Gray code sector number increases accurately continuously.

If the Gray code sector number 104 increases continuously two times, the servo control MPU 7 outputs the sector number notify signal 112 to load "n" which is the Gray code sector number 104 to be received next, to the servo zone counter 4, and further, the servo control MPU 7 outputs the servo count start signal 111 to cause the servo zone counter 4 to start the counting operation (Step S4).

In a Step S5, the servo control MPU 7 ascertains that the value indicated by the servo zone number signal 110 continuously counts up, at each time receiving the servo zone signal 108, from "n" to "n+1", which is the number next to "n", and then to "n+2", and further to "n+3". If the value indicated by the servo zone number signal 110 is not counted up properly, it is concluded that the servo zone counter 4 is faulty, and the operation is returned to the head of the Step 4. On the other hand, if it is ascertained that the value indicated by the servo zone number signal 110 is counted up properly, it is concluded that the servo zone counter 4 properly operates. Thus, the initialization of the servo zone counter 4 is completed (Step 6).

Furthermore, as mentioned hereinbefore, the servo control MPU 7 monitors the coincidence signal 109, and if the coincidence signal 109 is active, the servo control MPU 7 concludes that the servo zone counter 4 operates normally and the Gray code sector number 104 is correct, and can go to a next operation (not shown).

As seen from the above, the present invention makes it possible to detect the rotational position of the disk in real time, and also makes it possible to discriminate which of the fault of the servo zone counter and a misreading of the Gray code sector number is a trouble, different from the prior art apparatus synchronized by the index part.

The reason for this is that (1) the Gray code sector number is included in the Gray code region and (2) the servo zone counter is controlled to start the counting operation after the unquestionableness and the continuity of the Gray code sector number are confirmed.

In addition, since the servo zone counter is not initialized by using the index part appearing one for each one revolution, even if a medium defect exists in the index part and therefore even if the index part cannot be detected, it is possible to accurately detect the rotational position of the disk.

Furthermore, since the Gray code sector number is compared with the servo zone number signal which is the output of the servo zone counter, it is possible to detect the fault of the servo zone counter. Therefore, it is possible to prevent the writing operation based on an erroneous detection of the rotational position, thereby to avoid a data destroy.

Thus, the present invention can elevate reliability in the detection of the rotational position of the disk.

The invention has thus been shown and described with reference to the specific embodiments. However, it should be noted that the present invention is in no way limited to the details of the illustrated structures but changes and modifications may be made within the scope of the appended claims.

I claim:

1. Magnetic disk apparatus adopting a data surface servo method, wherein a magnetic disk includes a plurality of tracks formed thereon, and in each of said tracks, servo information used for positioning a head in said track, is written with equal intervals, characterized in that each of said servo information contains, in the form of a Gray code, a cylinder number indicative of an address of said track, and a sector number indicative of the order of said servo information in said track, and wherein said apparatus further comprises:

a shift register receiving, in response to a system clock, a digital read-out signal which is generated in the form of a pulse from an analog signal including servo information, said shift register outputting a shift register output signal in the form of parallel data, including a Gray code;

a timing generator enabled in response to a motor speed good signal which is activated when the revolution speed of the magnetic disk apparatus is a revolution number of a steady-state revolution, for generating a Gray code search signal, said timing generator receiving said system clock, for generating a servo zone signal used for detecting a servo zone, at a predetermined interval after an index signal is received;

a Gray code detecting circuit receiving said shift register output signal, and enabled in response to said Gray code search signal, to decode said Gray code included in said shift register output signal and including a Gray code cylinder number and a Gray code sector number, said Gray code detecting circuit outputting said Gray code sector number, said Gray code detecting circuit also detecting an index pattern which is included in said shift register output signal and which appears one for each one track, said Gray code detecting circuit outputting said index signal at each time said index pattern is detected;

a servo zone counter loaded with a sector number indicated by a sector number notify signal, and enabled, in response to a servo count start signal, to start to count up its count value which starts from the loaded sector number and is incremented in response to each servo zone signal, said count value of said servo zone counter being outputted as a servo zone number signal;

a servo control microprocessing unit receiving said Gray code sector number, said index signal and said servo zone signal, for checking unquestionableness and continuity of said Gray code sector number and for outputting to said servo zone counter said sector number notify signal indicative of the sector number to be received next, after the unquestionableness and the continuity of said Gray code sector number are confirmed, said servo control microprocessing unit outputting said servo count start signal to said servo zone counter after said sector number indicated by said sector number notify signal is loaded into said servo zone counter, said servo control microprocessing unit monitoring said servo number signal at each time receiving said servo zone signal, for checking a continuous counting-up of said servo number signal, to return the operation of outputting said sector number notify signal if said servo number signal is not counted up continuously; and a comparator comparing said Gray code sector number and said servo zone number signal at each time said servo zone signal is generated, for outputting a coincidence signal when said Gray code sector number and said servo zone number signal becomes coincident with each other.

2. A data surface servo method for a magnetic disk apparatus wherein a magnetic disk includes a plurality of tracks formed thereon, and in each of said tracks, servo information used for positioning a head in said track, is written with equal intervals, characterized in that each of said servo information contains, in the form of a Gray code, a cylinder number indicative of an address of said track, and a sector number indicative of the order of said servo information in said track, and characterized in that the method comprises the steps:

fetching into a shift register, in response to a system clock, a digital read-out signal which is generated in the form of a pulse from an analog signal including servo information, and outputting a parallel output of said shift register as a shift register output signal including a Gray code;

generating a Gray code search signal in response to a motor speed good signal which is activated when the revolution speed of the magnetic disk apparatus is a revolution number of a steady-state revolution, and receiving said system clock, for generating a servo zone signal used for detecting a servo zone, at a predetermined interval after an index signal is received;

receiving said shift register output signal in response to said Gray code search signal, to decode said Gray code included in said shift register output signal and including a Gray code cylinder number and a Gray code sector number, for outputting said Gray code sector number, and also detecting an index pattern which is included in said shift register output signal and which appears one for each one track, for outputting said index signal at each time said index pattern is detected;

loading a servo zone counter with a sector number indicated by a sector number notify signal, and enabling said servo zone counter in response to a servo count start signal, to cause it to start to count up its count value which starts from the loaded sector number and is incremented in response to each servo zone signal, and outputting said count value of said servo zone counter as a servo zone number signal;

receiving said Gray code sector number, said index signal and said servo zone signal, for checking unquestionableness and continuity of said Gray code sector number and outputting to said servo zone counter said sector number notify signal indicative of the sector number to be received next, after the unquestionableness and the continuity of said Gray code sector number are confirmed, and further outputting said servo count start signal to said servo zone counter after said sector number indicated by said sector number notify signal is loaded into said servo zone counter;

monitoring said servo number signal at each time receiving said servo zone signal, for checking, a continuous counting-up of said servo number signal, to return the operation of outputting said sector number notify signal if said servo number signal is not counted up continuously; and comparing said Gray code sector number and said servo zone number signal at each time said servo zone signal is generated, for outputting a coincidence signal when said Gray code sector number and said servo zone number signal becomes coincident with each other.

* * * * *

UNITED STATES PATENT AND TRADEMARK OFFICE
CERTIFICATE OF CORRECTION

PATENT NO.   : 5,805,368
DATED        : September 8, 1998
INVENTOR(S)  : TETSUYUKI HISHIKAWA It is certified that error appears in the above-identified patent and that said Letters Patent is hereby corrected as shown below:

Claim 2, Col. 10, line 23, "for checking, a" should be --for checking a--.

Signed and Sealed this

Tenth Day of August, 1999

Attest:

Q. TODD DICKINSON

Attesting Officer

Acting Commissioner of Patents and Trademarks